United States Patent Office 3,355,431
Patented Nov. 28, 1967

3,355,431
REACTION PRODUCT OF AN ISOCYANATE-TERMINATED POLYURETHANE AND AN AMMONIA FORMALDEHYDE CONDENSATE AND PROCESS OF PREPARING SAME
Clare Augustus Stewart, Jr., Wilmington, Del., assignor to E. I. du Pont de Nemours and Company, Wilmington, Del., a corporation of Delaware
No Drawing. Filed June 24, 1964, Ser. No. 377,501
17 Claims. (Cl. 260—72)

ABSTRACT OF THE DISCLOSURE

The present invention is directed to a novel reaction product of an isocyanate-terminated polyurethane and an ammonia-formaldehyde condensate and method of preparing said reaction product. A stoichiometric excess of an organic polyisocyanate is reacted with a compound containing at least two hydroxy groups followed by reacting the resulting prepolymer with the isocyanate reactive product obtained by reacting formaldehyde and ammonia in the presence of solvent.

---

Elastomeric or plastic materials based on polyurethanes provide an unusual combination of hardness, abrasion resistance, and resistance to oils and solvents. For many applications, such as in coatings, binding agents for nonwoven fibers, and adhesives, it is desirable to have the polyurethane material available in a fluid form which may be readily converted under mild conditions to a cured material of good physical properties.

It is the object of this invention to provide such a polyurethane material and methods for its preparation and curing. Other objects will appear hereinafter.

The new polyurethane material of the present invention is the reaction product of (a) the prepolymer obtained by reacting a stoichiometric excess of an organic polyisocyanate with a compound containing at least two hydroxy groups and (b) the isocyanate reactive product obtained by reacting formaldehyde and ammonia in the presence of solvent, the molar ratio of formaldehyde to ammonia being at least 0.8:1. By the proper selection of the relative amounts of components (a) and (b), the reaction product can be made fluid and curable under mild conditions to films possessing good physical properties. When the aforementioned reaction procedure is varied, for example by first forming a urea-terminated reaction product, the subsequent reaction with formaldehyde and heating to a mild temperature, such as 100° C., does not produce a vulcanizate having satisfactory properties.

As a general rule, the amount of component (b) should be at least sufficient to react with the NCO groups present in (a). The isocyanate reactive ingredients present in (b) are particular reaction products of ammonia and formaldehyde as will be explained hereinafter and may include as well the solvent medium in which component (b) is prepared, since the typical solvent types, viz., water or alcohol, are also isocyanate reactive. The amount of the ammonia and formaldehyde reactants necessary to obtain an acceptable reaction product with component (a) will depend on which of these types of solvents are employed. When the solvent is an alcohol, preferably, at least about 1 mole of isocyanate-reactive ammonia-formaldehyde reaction product is provided by (b) for each mole of NCO groups present in (a). When, however, the solvent is water, the minimum amount of isocyanate-reactive reaction product present may be about 0.5 mole per mole of NCO groups.

The preparation of isocyanate-terminated polyurethanes, component (a), by reacting a stoichiometric excess of a polyisocyanate with a compound containing two or more hydroxyl groups per molecule is well known in the art. A wide variation is possible in the selection of the hydroxyl-containing component and the isocyanate component, depending on the physical and chemical properties desired in the cured product. It is generally preferred to use a hydroxyl-containing component having a molecular weight ranging from about 300 to 3000 in order that the final cured product have satisfactory physical properties. A difunctional hydroxy component is usually preferred, although components of higher functionality may be used if desired. In general, however, the use of components having more than two functional groups will introduce problems of increased viscosity and of poorer solubility of the isocyanate-terminated prepolymer. Substituents which do not interfere with either prepolymer formation or the subsequent reaction with component (b) may be present on the reactants forming component (a).

Examples of suitable polyhydroxy components include hydroxyl-terminated polyethers prepared by polymerization or copolymerization of cyclic ethers such as ethylene oxide, propylene oxide, trimethylene oxide, and tetrahydrofuran, or by the polymerization of one of these cyclic ethers in the presence of polyhydric alcohols such as ethylene glycol (or other alkanediols), glycerol, trimethylolpropane, or sorbitol.

Other polyhydroxy compounds typically employed are polythioethers, polyesters, and polyester amides. Examples of suitable hydroxy-terminated polythioethers are the polycondensation products of 2,2'-thiodiethanol alone or with other dihydroxy compounds such as butanediol or ethylene glycol.

Polyesters which are suitable for use in practicing this invention include the hydroxyl-terminated polyesters prepared from dicarboxylic acids and aliphatic dihydroxy compounds. Representative examples of dicarboxylic acids which may be used include succinic acid, glutaric acid, and adipic acid, and benzenedicarboxylic acids. Examples of suitable aliphatic hydroxy compounds are ethylene glycol, proplyene glycol, 1,3-butanediol, 1,4-butanediol, and 1,6-hexanediol. Polyesters having more than two hydroxy groups may be prepared in known ways using one or more reactants having more than two functional groups.

The polyester amides are prepared by reacting any of the representative polycarboxylic acids mentioned above with an amino alcohol such as ethanolamine or aminopropanol.

If desired, more than one type of hydroxy-containing compound may be used in preparing the curable compositions in accordance with this invention.

The isocyanates to be used in practicing this invention may be aliphatic, cycloaliphatic, or aromatic in nature. In general, diisocyanates are preferred, although in some cases isocyanates of higher functionality may be desirable. Examples of suitable isocyanates include 2,4-tolylene diisocyanate, 2,6-tolylene diisocyanate, 1,5-naphthylene diisocyanate, 4,4'-methylenebis(phenyl isocyanate), 4,4'-methylenebis(cyclohexyl isocyanate), 1,6-hexanediisocyanate, 4,4',4''-methylidinetris(phenyl isocyanate) and O,O, O-tris(4-isocyanatophenyl)thiophosphate. For some applications there may be an economic advantage in using technical diisocyanates containing moderate amounts of impurities having higher functionality.

In practicing the process of this invention, the hydroxyl-containing component is reacted with a stoichiometric excess of the polyisocyanate to form an isocyanate-terminated reaction product, hereafter, for convenience, called a "prepolymer." The ratio of hydroxy-containing component to isocyanate component is generally chosen to give a prepolymer (component (a)) containing between 2 and 15% by weight of free NCO groups, preferably between 3 and 9%, depending on the components selected and the desired hardness of the final product.

In preparing the isocyanate reactive product by component (b), ammonia and formaldehyde are reacted in a suitable solvent or mixture of solvents. The solvents and reaction conditions will be discussed hereinafter. At least 0.8 mole of formaldehyde per mole of ammonia should be used; if a smaller proportion of formaldehyde to ammonia is used, the products will, in general, not cure adequately. It is preferred to use a molar proportion of formaldehyde to ammonia in the range of 1:1 to 3:1. If a larger proportion is used, the resulting product will contain a significant amount of unreacted formaldehyde, which will be a health hazard to personnel.

The amount of ammonia to be used will depend on the isocyanate content of the prepolymer and, to a certain extent, on other isocyanate-reactive species present in component (b).

Solvents to be used in preparing the reactive mixture of nitrogen-containing compounds include those which are suitable for use in moderating the reactions of formaldehyde. Pure, monomeric formaldehyde is unstable with respect to polymerization and is extremely reactive with many organic compounds. Formaldehyde is therefore ordinarily obtained and used as a solution in a solvent with which it reacts reversibly so that reactions may be carried out at a more controlled rate and with reduced evolution of heat. Solvents suitable for this in the present invention are water and alcohols, such as methanol, ethanol, isopropanol, and butanol. Higher alcohols may be used if solvents of lower volatility are desired. Other solvents may be added to increase the mutual solubility of the various components of the final composition and to assist in absorbing the heat of reaction of ammonia and formaldehyde. Examples of suitable additional solvents include ketones such as acetone, methyl ethyl ketone, and ethers such as tetrahydrofuran, glycol dimethyl ether, and dioxane. The temperature of mixing the ammonia and formaldehyde may conveniently be between 10 and 35° C. While higher temperatures may be used, they shorten the period in which the ammonia-formaldehyde condensation products remain reactive with isocyanates.

If an alcohol or isocyanate-reactive solvent other than water is used in the preparation of the products of this invention, it is desirable to employ a molar ratio of at least 1:1 of reactive ammonia derivatives to isocyanate, i.e., NCO groups, to minimize the reaction of the prepolymer with the solvent, which reaction will terminate the chain-extension process and adversely affect the quality of the final cured product. If water is the only isocyanate-reactive component in the solution other than the reaction products of ammonia and formaldehyde, it is possible to use as little as 0.5 mole of reactive ammonia derivatives per mole of NCO groups, since any residual isocyanate will react with water with the evolution of carbon dioxide and the formation of chain-extending, curable, urea groups. If less than this minimum proportion of reactive ammonia derivative is present in component (b), the final product will have an undesirably high viscosity. The preferred proportions when the solvent is water is from 1 to 1.5 mole of reactive ammonia derivatives per mole of NCO. By mole of NCO groups is meant the weight of prepolymer present in the form of NCO groups divided by 42, the sum of the atomic weights of NCO.

The prepolymer and ammonia-formaldehyde solution should be mixed before the ammonia and formaldehyde have reacted to form a substantial amount of hexamethylenetetramine which is unreactive with isocyanates. Ammonia and formaldehyde are known to react to form a variety of products, leading ultimately to hexamethylenetetramine. Intermediate reaction products include (hydroxmethyl)amine, bis(hydroxymethyl)amine and tris(hydroxymethyl)amine. In the presence of alcohols these intermediates may be modified to include (alkoxymethyl)amines. It is the mixture of these intermediate reaction products that is intended by the expression "isocyanate reactive product" or "reactive ammonia derivatives." The solvent in which these reaction products are formed is excluded from the meaning of these expressions, but it is intended that the solvent is present with the ammonia-formaldehyde reaction products to form component (b).

The time available during which the ammonia-formaldehyde solution remains reactive will vary with such factors as the solvents employed, the degree of dilution, and the temperature of solution. In general, equally satisfactory results are obtained when the prepolymer is mixed with the ammonia-formaldehyde solution within a period of 15 seconds to 10 minutes after the preparation of the latter. This period may be increased to as much as sixty minutes if a correspondingly greater ratio of ammonia to isocyanate is used in preparing the reaction solution (b) to allow for consumption of ammonia in the formation of hexamethylenetetramine. For reasons of economy, generally no greater than a minor proportion (less than 50% by weight) of hexamethylenetetramine should be present in the ammonia-formaldehyde reaction product.

The method of mixing the prepolymer is not critical. In general, it is desirable to use additional solvent as a diluent for the prepolymer to facilitate mixing by reducing the viscosity of the final solution. The diluting solvent should be one which is unreactive with the isocyanato groups and which will be compatible in the final mixture. The suitability of a diluting solvent will also depend on the intended use of the final composition. Examples of solvents which are in general considered suitable are acetone, trichloroethylene, and xylene. If a prepolymer of low viscosity is employed or if efficient mixing equipment is to be used, it is not necessary to dilute the prepolymer component, and additional diluting solvent may be added to the solution of formaldehyde and ammonia or omitted entirely from the formulation.

The temperature resulting from mixing the prepolymer component with the solution of ammonia and formaldehyde is not important so long as the temperature is not allowed to remain high enough to effect premature curing of the product. It is preferred that the temperature should go no higher than 50° C., although a temperature as high as 90° C. is tolerable provided the composition is immediately cooled.

It is believed that the isocyanate groups react primarily with the amine groups in a mixture of (hydroxymethyl)amine and bis(hydroxymethyl)amine (or the corresponding alkoxy derivatives) to form urea groups substituted with the hydroxymethyl (or alkoxymethyl) groups. If the resultant solution of reaction product is not to be used within a few days, it may be rendered more stable by the addition of a weakly basic material buffering agent such as a tertiary amine, sodium acetate, or sodium borate. Examples of suitable tertiary amines are triethylamine, triethanolamine, and N,N,N',N'-tetrakis(2-hydroxypropyl)ethylenediamine. The addition of 0.01 to 0.02 mole of a tertiary amine per mole of formaldehyde is sufficient to render the final solutions stable for many months at room temperature, whereas the unstabilized solutions will show an undesirable increase in viscosity within a few days.

The final composition (reaction product of components (a) and (b)) provides a fluid mixture which may be converted to a high polymer. Evaporation of the solvent leaves the film-forming polymer which cures slowly at room temperature. The curing time may be shortened by heating or by the addition of an acid catalyst. Satisfactorily cured films are obtained when the film is heated at 100–120° C. for 30 minutes to one hour. When the solution contains a basic stabilizer it is desirable to add a small amount of an acidic catalyst such as glycolic acid, acetic acid, and/or hydrochloric acid. In general, any of the acidic catalysts used in curing of urea-formaldehyde resins may be used.

The preferred curing method to be used will vary with the reactants used in preparing the product, in the amount and nature of the stabilizer, and the particular application for which the product is being used. The unstabilized solutions which have been prepared using aqueous formaldehyde solution will usually contain a small amount of formic acid. These solutions will produce films which cure rapidly at 100° C. or slowly at room temperature. Even when the solution contains a basic stabilizer, the addition of as little as 0.3% by weight (based on weight of prepolymer used) of glycolic acid results in a solution which has adequate stability for most applications and which yields rapidly-curing films upon heating. When the isocyanate used in the prepolymer is cycloaliphatic, for example, 4,4'-methylenebis(cyclohexyl isocyanate), it has been found that, even when the solution contains a basic stabilizer, no acid catalyst is necessary to obtain films which cure at 100–120° C. within a reasonable time. On the other hand, if an aromatic diisocyanate, such as 2,4-tolylene diisocyanate, is used, it is desirable to add a small amount of acid catalyst when the solution has been stabilized with a tertiary amine. If a polyester is used as the hydroxyl-containing component in preparing the prepolymer, hydrolysis of the ester linkages in the product, which occurs slowly, will yield enough acid to act as a catalyst. If desired, the catalyst may be a compound which will generate an acid when the product is heated.

The properties of the products prepared in accordance with this invention may be varied in many ways. It is possible, for example, to include other resinous materials which may either be inert or co-curable with the product. Also other additives conventionally used in processing polyurethane products may be dispersed or dissolved in the solution; examples of such materials include pigments, antioxidants, and screening agents for ultraviolet rays. It is also possible to modify the prepolymer by pre-reacting a portion of its isocyanato groups with chain-extending agents such as water, low-molecular weight dihydroxy compounds and diamines. These well-known additives and modifications are included within the scope of the present invention.

The final composition may be use in a variety of ways. Films may be prepared using conventional techniques. The product may also be used as a binder for particulate material, as a fabric-treating agent, as a coating material, or as an adhesive.

The following examples are illustrative of the present invention. Parts and percents are by weight unless otherwise noted.

*Example 1*

(a) An isocyanate-terminated prepolymer is prepared by mixing one mole of polytetramethylene ether glycol (No. ave. M.W. 1000) and 1.6 moles of 2,4-tolylene diisocyanate and heating the reactants for 2 hours at 80° C. The product is found to contain 4.15% by weight of NCO groups by adding an excess of dibutylamine and back titrating with standard hydrochloric acid. One hundred grams of this prepolymer is diluted with 100 ml. of tetrahydrofuran.

(b) A solution is prepared by mixing at room temperature 50 ml. of tetrahydrofuran, 18.5 ml. of 37% aqueous formaldehyde, and 5.5 ml. of 28% aqueous ammonia. After one minute this solution is added with agitation to the solution prepared in paragraph (a). A very small amount of gas (believed to be carbon dioxide) is evolved and a homogeneous solution is formed. A film, prepared by pouring the solution on an aluminum plate, allowing the solvents to evaporate at room temperature, and heating at 100° C. for 30 minutes, is tough and rubbery.

A summary of the molar proportions of the various reactants used in preparing the product of this example is as follows:

Moles used—
  Formaldehyde _____ 0.25
  Ammonia _____ 0.082
  NCO (calculated as described before) _____ 0.099
Molar ratios—
  Formaldehyde:Ammonia _____ 3.05
  Ammonia:NCO _____ 0.83

When the procedure of this example is repeated except that the aqueous ammonia is added to the prepolymer solution instead of to the formaldehyde, the films obtained remain soft and tacky even after prolonged heating at 100° C.

*Example 2*

In this example a prepolymer is prepared essentially as described in Example 1 except that the molar ratio of 2,4-tolylene diisocyanate to polytetramethylene ether glycol is 2:1. The prepolymer contains 6.3% by weight of NCO groups.

To a 250 ml. Erlenmeyer flask stirred with a magnetic stirrer are added 80 ml. of acetone, 12.5 ml. of 37% aqueous formaldehyde, and 4.2 ml. of 28% aqueous ammonia. After one minute 50 g. of the prepolymer is added. Five grams of this product, mixed with 2 ml. of acetone and 2 ml. of n-butanol, is spread on an aluminum sheet, and the solvent is evaporated off first at room temperature and then at 70° C. The resulting film is heated for 30 minutes at 100° C. The stress-strain properties are determined using strips ¼ inch wide and 1–10 mils in thickness. The properties are as follows:

Tensile strength at break _____p.s.i__ 4800
Modulus at 300% elongation _____p.s.i__ 900
Elongation at the break _____percent__ 440

The summary of molar proportions of reactants used in this example is as follows:

Moles used—
  Formaldehyde _____ 0.168
  Ammonia _____ 0.062
  NCO _____ 0.075
Molar ratios—
  Formaldehyde:Ammonia _____ 2.71
  Ammonia:NCO _____ 0.83

*Example 3*

To an agitated flask is added 1800 ml. of acetone, 333 ml. of a 37% aqueous solution of formaldehyde, and 100 ml. of 28% aqueous ammonia. After 10 minutes 1785 g. of a prepolymer as described in Example 1 is added rapidly with cooling and vigorous agitation. At the end of the addition, a temperature of 35° C. is reached, a small amount of gas is evolved, and a clear solution is obtained. An additional 500 ml. of acetone is added to redissolve water which separates as the reaction mixture cools to room temperature. Films are cast on an aluminum surface using 5 g. of the solution, 1 ml. of n-butanol, and 2 ml. of acetone. The films are dried in air for 10 minutes, evaporated at 65° C. for 20 minutes, and cured by heating at 100° C. for 1 hour. The stress-strain properties of the film are as follows:

Tensile strength at break _____p.s.i__ 4400
Elongation _____percent__ 460
Modulus at 300% elongation _____p.s.i__ 600

The summary of the molar proportions used in this example is as follows:

Moles used—
  Formaldehyde _____ 4.48
  Ammonia _____ 1.48
  NCO _____ 1.76
Molar ratios—
  Formaldehyde:Ammonia _____ 3.03
  Ammonia:NCO _____ 0.84

Example 4

In this example the prepolymer is prepared from one mole of polytetramethylene ether glycol (No. ave. M.W. 1000) and 1.75 moles of 4,4'-methylenebis(cyclohexyl isocyanate) by heating the reactants at 80° C. for 2 hours in the presence of 10 parts per million parts, by weight of reactants, of stannous octoate. The prepolymer contains 4.2% NCO. Following the procedure of Example 2 a resin solution is prepared from 30 ml. of acetone, 2.8 ml. of 28% aqueous ammonia, 8.4 ml. of 37% aqueous formaldehyde, and a solution of 45 g. of prepolymer in 45 g. of acetone. A clear, tough, colorless film is obtained from the resulting solution.

The molar ratio of reactant used are as follows:

Moles—
- Formaldehyde _____ 0.113
- Ammonia _____ 0.046
- NCO _____ 0.045

Molar ratios—
- Formaldehyde:Ammonia _____ 2.18
- Ammonia:NCO _____ 1.0

Example 5

The following solutions are prepared:

*Solution A.*—60 grams of 100% paraformaldehyde, and 4 g. of N,N,N',N'-tetrakis (2-hydroxypropyl)ethylenediamine are dissolved in 150 ml. of methanol with gentle warming, and enough methanol is added to bring the total volume to 250 ml.

*Solution B.*—40 ml. of 28% aqueous ammonia in 140 ml. of methanol.

*Solution C.*—50 g. of the prepolymer of Example 4 in 100 g. of acetone.

Five reactive resin solutions are prepared by adding various volumes of Solution A to 2 ml. of Solution B, mixing, and adding 10 g. of Solution C. These resin solutions are still stable after six months. That is, they remain reactive and do not gel. Films are cast on aluminum foil, the solvents are evaporated, and the resin is cured at 120° C. for 30 minutes.

Final solution (5) is prepared as follows: 10 ml. of the final solution (4) is diluted with 10 ml. of trichloroethylene and 0.1 ml. of glycolic acid is added. A film is cast on aluminum foil and allowed to stand at room temperature. The resultant film is tested after two weeks standing. The following table summarizes the proportions of materials used and the properties of the films obtained:

The molar proportions of reactants used is shown in the following table:

Moles used—
- Formaldehyde _____ 0.040
- Ammonia _____ 0.033
- NCO _____ 0.0168

Molar ratios—
- Formaldehyde:Ammonia _____ 1.21
- Ammonia:NCO _____ 1.96

Example 7

The prepolymer used in this example is prepared by reacting 2 moles of 4,4'-methylenebis(phenyl isocyanate) with one mole of a polyester prepared from adipic acid and a mixture of ethylene and propylene glycols (No. ave. M.W. 1840). The prepolymer contains 3.6% NCO. 10 ml. of Solution A of Example 5, 10 ml. of acetone and 2.5 ml. of 28% aqueous ammonia are mixed. To this mixture is added 30 g. of prepolymer which has been diluted with 30 g. of acetone. A film prepared using the procedure of Example 5 and cured at 120° C. for one hour is tough and rubbery.

The molar amounts and proportions of reactants used are summarized in the following table:

Moles used—
- Formaldehyde _____ 0.080
- Ammonia _____ 0.037
- NCO _____ 0.0257

Molar ratios—
- Formaldehyde:Ammonia _____ 2.16
- Ammonia:NCO _____ 1.44

As many widely different embodiments of this invention may be made without departing from the spirit and scope thereof, it is to be understood that this invention is not limited to the specific embodiments thereof except as defined in the appended claims.

What is claimed is:

1. The curable reaction product of (a) the prepolymer obtained by reacting a stoichiometric excess of an organic polyisocyanate with a compound containing at least two hydroxy groups and (b) the isocyanate reactive product obtained by reacting formaldehyde and ammonia in the presence of solvent, the molar ratio of formaldehyde to ammonia being at least 0.8:1 and the amount of (b) being at least sufficient to react with the NCO groups present in (a), with the proviso that when said solvent

|  | Soln. A, ml. | CH₂O, moles | NH₃, moles | NCO, moles | Molar Ratios | | Properties of Films | | |
|---|---|---|---|---|---|---|---|---|---|
|  |  |  |  |  | CH₂O:NH₃ | NH₃:NCO | Tensile Strength at Break, p.s.i. | Elongation at Break, percent | Modulus at 300% Elongation, p.s.i. |
| (1) | 0.5 | 0.004 | 0.0066 | 0.0033 | 0.61 | 2 | No cure. Film remained sticky. | | |
| (2) | 0.67 | 0.0054 | 0.0066 | 0.0033 | 0.82 | 2 | 3,600 | 350 | 2,300 |
| (3) | 1.0 | 0.008 | 0.0066 | 0.0033 | 1.21 | 2 | 3,850 | 310 | 3,200 |
| (4) | 1.4 | 0.011 | 0.0066 | 0.0033 | 1.67 | 2 | 4,000 | 320 | 3,000 |
| (5) | Same as (4). See above for preparation. | | | | | | 3,800 | 300 | 2,000 |

Example 6

5 ml. of Solution A of Example 5 and 10 ml. of Solution B of Example 5 are mixed and to the mixture is added 17 g. of the prepolymer of Example 1 dissolved in 33 ml. of acetone. A film prepared from this solution (which contains N,N,N',N'-tetrakis(2-hydroxypropyl)-ethylenediamine as a buffering agent) cures very slowly at 120° C. without the addition of an acid catalyst. When 0.1 ml. of 70% glycolic acid is added to 10 ml. of the resin solution, the films prepared cure readily at 120° C.

is water, the molar ratio of said isocyanate reactive product to said NCO groups is as little as 0.5:1.

2. The curable reaction product as recited in claim 1 wherein said prepolymer contains 2–15% by weight of free NCO groups based on the weight of (a).

3. The curable reaction product as recited in claim 1 wherein the molar ratio between the ammonia of (b) and the NCO groups of (a) is from 1:1 to 1.5:1.

4. The curable reaction product as recited in claim 1 wherein the molar ratio of said formaldehyde to said ammonia is from 1:1 to 3:1.

5. The curable reaction product as recited in claim 1 wherein (b) contains no greater than a minor proportion of hexamethylenetetramine.

6. The curable reaction product as recited in claim 1 contained in an inert organic solvent.

7. The curable reaction product as recited in claim 1 wherein said solvent is an alcohol.

8. The curable reaction product as recited in claim 1 wherein the hydroxyl-containing compound has a molecular weight of about 300 to 3000.

9. The curable reaction product as recited in claim 8 wherein said hydroxyl-containing compound is polytetramethylene ether glycol.

10. The curable reaction product as recited in claim 1 wherein said organic polyisocyanate is tolylene diisocyanate.

11. A process for preparing a curable composition, comprising contacting and reacting (a) the prepolymer obtained by reacting a stoichiometric excess of an organic polyisocyanate with a compound containing at least two hydroxyl groups with (b) the isocyanate reactive product obtained by reacting formaldehyde and ammonia in the presence of solvent, the molar ratio of formaldehyde to ammonia being at least 0.8:1 and the amount of (b) being at least sufficient to react with the NCO groups present in (a), with the proviso that when said solvent is water, the molar ratio of said isocyanate reactive product to said NCO groups is as lttle as 0.5:1.

12. The process as recited in claim 11 wherein the contacting and reacting step is carried out in the presence of inert organic solvent.

13. The process as recited in claim 11 wherein the contacting and reacting step is carried out at a sufficiently low temperature to prevent premature curing of said composition.

14. The process as recited in claim 13 wherein the contacting and reacting step is carried out at a temperature less than 50° C.

15. The process as recited in claim 11 wherein (b) is used within 15 seconds to 10 minutes after its preparation.

16. A curable composition consisting essentially of the reaction product of (a) the prepolymer obtained by reacting a stoichiometric excess of an organic polyisocyanate with a compound containing at least two hydroxy groups and (b) the isocyanate reactive product obtained by reacting formaldehyde and ammonia in the presence of solvent, the molar ratio of formaldehyde to ammonia being at least 0.8:1; and the amount of (b) being such that the molar ratio of said isocyanate reactive product to the NCO groups present in (a) is at least 1:1, with the proviso that when said solvent is water, said molar ratio is as little as 0.5:1; and a stabilizing amount of a buffering agent.

17. The curable composition as recited in claim 16 wherein said buffering agent is a tertiary amine.

References Cited
UNITED STATES PATENTS

| | | | |
|---|---|---|---|
| 2,349,756 | 5/1944 | Pratt | 260—72 |
| 3,087,912 | 4/1963 | Wagner et al. | 260—72 |

WILLIAM H. SHORT, *Primary Examiner.*

E. M. WOODBERRY, *Assistant Examiner.*